US006318243B1

United States Patent
Jones

(10) Patent No.: US 6,318,243 B1
(45) Date of Patent: Nov. 20, 2001

(54) TWO-PIECE PISTON ASSEMBLY

(76) Inventor: D. Kent Jones, 1030 Van Gogh Dr., Concord, NC (US) 28027

( * ) Notice: Subject to any disclaimer, the term of this patent is extended or adjusted under 35 U.S.C. 154(b) by 0 days.

(21) Appl. No.: 09/387,011

(22) Filed: Aug. 31, 1999

(51) Int. Cl.[7] ..................................................... F16J 1/14
(52) U.S. Cl. .................. 92/189; 92/208; 92/224
(58) Field of Search .............................. 92/216, 217, 218, 92/219, 238, 239, 208, 209, 222, 224, 260, 187, 189, 190; 123/193.6

(56) References Cited

U.S. PATENT DOCUMENTS

| | | | |
|---|---|---|---|
| 1,017,498 | * | 2/1912 | Bittner .................................... 92/189 |
| 1,391,161 | | 9/1921 | Atkinson . |
| 1,427,673 | | 8/1922 | Allen . |
| 1,427,930 | * | 9/1922 | Baker ...................................... 92/218 |
| 1,472,893 | * | 11/1923 | Tismer ..................................... 92/218 |
| 1,540,443 | * | 6/1925 | White ................................... 92/218 X |
| 1,542,209 | * | 6/1925 | Bergeron ............................ 92/189 X |
| 1,554,157 | * | 9/1925 | Deans ...................................... 92/190 |
| 1,618,601 | * | 2/1927 | Matthews .............................. 92/215 |
| 1,704,393 | | 3/1929 | Leary . |
| 1,812,391 | * | 6/1931 | Zechlau ................................... 92/215 |
| 1,940,629 | | 12/1933 | Mahle . |
| 2,049,922 | * | 8/1936 | Nienow .................................. 92/189 |
| 2,051,546 | | 8/1936 | Crist . |
| 2,621,092 | | 12/1952 | Clark . |
| 4,013,057 | * | 3/1977 | Guenther ............................ 123/193.6 |
| 4,617,888 | * | 10/1986 | Dent ...................................... 123/307 |
| 4,683,808 | * | 8/1987 | Wacker et al. ......................... 92/208 |
| 4,694,735 | * | 9/1987 | Tatematsu et al. ..................... 92/208 |
| 4,727,795 | * | 3/1988 | Murray et al. ......................... 92/189 |
| 5,144,884 | | 9/1992 | Kelly . |
| 5,230,148 | * | 7/1993 | Leites et al. ....................... 92/208 X |
| 5,499,572 | | 3/1996 | Cobble . |
| 5,730,090 | | 3/1998 | Kling . |
| 5,778,846 | | 7/1998 | Mielke . |
| 5,787,796 | | 8/1998 | Ribeiro . |
| 5,797,311 | | 8/1998 | Gasthuber . |
| 5,839,352 | | 11/1998 | Ribeiro . |
| 6,164,261 | * | 12/2000 | Kruse ................................. 123/193.6 |
| 6,170,454 | * | 1/2001 | McFarland et al. ............... 123/193.6 |

FOREIGN PATENT DOCUMENTS

720352 * 10/1930 (FR) ........................................ 92/217

* cited by examiner

*Primary Examiner*—John E. Ryznic
(74) *Attorney, Agent, or Firm*—Dougherty & Clements LLP

(57) ABSTRACT

An improved two-piece assembly having a piston skirt and piston crown made from two different materials. The piston assembly attaching to a piston rod without the use of an external bore in the piston skirt.

20 Claims, 6 Drawing Sheets

TWO-PIECE PISTON ASSEMBLY

FIELD OF THE INVENTION

The present invention relates to a two-piece piston assembly, and more particularly to a two-piece piston assembly which improves the efficiency of an internal combustion engine.

BACKGROUND OF THE INVENTION

Traditionally, pistons used in internal combustion engines (ICE) have been of a unitary construction. These pistons have been made from cast iron or steel. As fuel economy has become a more significant factor in ICE design, engine makers have had to develop lighter weight pistons capable of operating at higher temperatures for more efficient engines. These efforts have typically involved two different approaches; the use of lighter weight materials or the use of materials having higher melting temperatures.

The typical choice for a lighter weight material to replace cast iron or steel is aluminum. Aluminum has a lower density and is easily machinable. Aluminum also has high thermal conductivity and is corrosion resistant. Unfortunately, aluminum has lower yield strength than cast iron or steel at the normal operating temperatures of pistons.

The second approach to solving this problem typically involves the use of a material with a higher melting point. The operating temperature of an engine is increased by using higher melting point materials. The relationship between high operating temperatures and efficiency is well understood by those skilled in the art. Unfortunately, higher melting point materials are typically more expensive than cast iron or steel, or cannot be fabricated to solve the problem in a cost-efficient manner.

As a result, the two-piece piston assembly has been developed as a compromise. The two-piece assembly allows two different materials to be used in the construction of a piston. The design usually has a lighter weight, the side being composed of a lighter material with a heavier, more thermally stable, crown material. The two-piece piston assembly allows the vehicle manufacturer to obtain both advantages of the original solutions to this problem and optimize the performance of ICE's.

The present invention is particularly useful for conventional automobile ICE's but may also be used with diesel ICE's.

The present invention employs the concept of a two-piece piston assembly and introduces further refinements into the assembly. The invention teaches the proper selection of joining surfaces to couple the two pieces of the piston assembly to reduce weight. The invention also teaches a method of fastening the piston assembly to the piston rod to eliminate the external holes in the piston assembly.

The invention also teaches a piston that has a reduced "dead-air space." Dead-air space is the space between the annular top ring groove on a piston crown and the top of a piston. The reduction of dead-air space improves fuel efficiency, increases engine power, reduces emissions, and improves engine performance.

DESCRIPTION OF THE RELATED ART

Applicant is aware of the following U.S. Patents concerning pistons:

| U.S. Pat. No. | Inventor | Issue Date | Title |
| --- | --- | --- | --- |
| 5,839,352 | Ribeiro | 11-24-1998 | ARTICULATED PISTON |
| 5,797,311 | Gasthuber | 08-25-1998 | PISTON/LINER ARRANGEMENT FOR RECIPROCATING-PISTON INTERNAL COMBUSTION ENGINE |
| 5,787,796 | Ribeiro | 08-04-1998 | ARTICULATED PISTON |
| 5,778,846 | Mielke | 07-14-1998 | FORGED OR CAST PISTON HEAD OF AN OSCILLATING SHAFT PISTON |
| 5,730,090 | Kling | 03-24-1998 | RECIPROCATING PISTON FOR INTERNAL COMBUSTION ENGINES |
| 5,499,572 | Cobble | 03-19-1996 | BI-TECH PISTON |
| 5,144,884 | Kelly | 09-08-1992 | TWO-PART PISTON ASSEMBLY DEVICE |
| 2,621,092 | Clark | 12-09-1952 | PISTON |
| 2,051,546 | Crist | 08-18-1936 | PISTON |
| 1,940,629 | Mahle | 12-19-1933 | PISTON ALLOY |
| 1,704,393 | Leary | 03-05-1929 | CONNECTING ROD |
| 1,427,673 | Allen | 08-29-1922 | UNIVERSAL PISTON ROD CONNECTION |
| 1,391,161 | Atkinson | 09-20-1921 | FOOD PRODUCT AND PROCESS OF PREPARING |
| 1,017,498 | Bittner | 02-13-1912 | PISTON FOR EXPLOSIVE ENGINES |

Ribeiro, U.S. Pat. No. 5,839,352, and Ribeiro, U.S. Pat. No. 5,787,796, both teach a two-piece piston assembly with opposing bores in the piston skirt. Neither patent teaches a piston crown and a piston skirt manufactured from different materials. Both patents teach a wrist pin that must be inserted through the exterior wall of the piston skirt and through the bores and bosses of the piston crown to retain the piston crown within the piston skirt. Neither patent teaches the use of a recession on the rim of a piston crown. The primary advantage of the Ribeiro pistons is that the piston skirt can be manufactured using conventional manufacturing or processes which reduces the cost of manufacturing.

Mielke, U.S. Pat. No. 5,778,846, teaches a multiple-piece piston assembly with a piston head and a ring section. The piston head may be manufactured from steel, cast iron, or aluminides including titanium aluminide. The ring section may consist of an aluminum piston alloy, a cast iron alloy, or other material. The piston head may be made from tempered steel or from a different, hardened material. Therefore, the patented piston assembly teaches a piston head and a ring section made from different materials. These materials may be joined by welding, soldering, frictional, or interlocking connection.

Cobble, U.S. Pat. No. 5,499,572, teaches a two-piece piston assembly with a piston head and a piston skirt. The piston assembly has a wrist pin that has been inserted through the exterior wall of the piston skirt. The piston crown and piston skirt are made from different materials. The piston crown is composed of metal. The piston skirt is composed of an epoxy resin. The piston crown and piston skirt are joined together by keying the piston skirt. The piston crown has no rim for joining the piston head to the piston skirt. Thus, the lower portion of the piston crown has a higher diameter than the upper portion of the piston skirt, which increases the weight of the piston structure. In addition, the piston crown has no recession on the rim.

Kelly, U.S. Pat. No. 5,144,884, teaches a two-part piston assembly having a piston skirt with a transverse bore. Kelly teaches a piston assembly with a piston pin attached to the piston skirt through the external bore. The piston crown is composed of a cast iron or steel. The piston skirt is composed of an aluminum alloy.

Clark, U.S. Pat. No. 2,621,092, teaches a piston head having a piston wrist pin for connecting the piston head to a connecting piston rod. The pin connects to the head through a special wrist pin retainer. The retainer allows for prevailing longitudinal movement of the pin while allowing rotation of the piston rod. Clark teaches an inner portion of the piston cap having piston bosses with holes through the bosses for accepting a wrist pin that is inserted through the exterior wall of a surrounding piston skirt.

Crist, U.S. Pat. No. 2,051,546, teaches a composite piston formed of a piston head and a piston skirt. The piston head and skirt may be made from different materials. The interior of the piston head has piston pin bosses which accept a wrist pin and which can be inserted through a hole in the exterior wall of a piston skirt.

Mahle, U.S. Pat. No. 1,940,629, teaches a piston head having a ring bearing portion composed of one material and having additional portions of the piston head made of different materials. Mahle also teaches a piston skirt with a portion that may be made of iron or other materials. The piston skirt has an extra hole therethrough for accepting a wrist pin.

Bittner, U.S. Pat. No. 1,017,498, teaches a piston head having a body and a head. Preferably, the body and head connect by a screw thread joint. The patented invention teaches that the piston body and head may screw together to form a piston having a hollow body. The piston head has a channel therethrough. The channel accepts a piston wrist pin that inserts through the piston head. The piston head attaches the piston rod to the piston head. The ends of the wrist pin extend within the piston body. The piston head ends flush with the outer sides of the piston part. The ends are internally located within the upper portion of the piston body so that the wrist pin may not extend through the outer surface of the piston body walls.

SUMMARY OF THE INVENTION

The invention provides a two-piece piston assembly with a piston crown and piston skirt. The piston crown has sidewalls, which have annular grooves. The piston crown can be made of steel, titanium, or other high melting point materials, such as metals, ceramics, intermetallics, and composites. The piston crown has a rim with external threads for connecting the piston crown to a separate piston skirt. The piston crown has a pair of pin bosses, which support an internal wrist pin. The internal wrist pin attaches the piston assembly to the piston rod without having to insert the pin through the exterior piston assembly walls. Therefore, the external ends of the wrist pin are wholly within the piston crown requiring no exterior holes in the piston wall for maintenance of the inserted wrist pin. The piston skirt may be made of aluminum or any other low density, high thermal conductivity material, such as a metal, ceramic, or composite. The separate piston skirt has threads on the interior surface of one end. The piston skirt couples with the piston crown. This configuration provides for lowered piston assembly weight and reduced dead-air space.

OBJECTS OF THE INVENTION

The principal object of the present invention is to provide an improved two-piece piston assembly having a crown portion made of a stronger material than prior constructions, with better high-temperature mechanical properties and a lighter weight side wall portion with higher thermal conductivity.

Another object of this invention is to provide a two-piece piston assembly having a crown portion and a side wall portion which are readily attachable. The outer surface of the side wall portion has a thread receiving portion that connects to a threaded portion of the crown, which provides for a lighter weight piston head design.

Another object of this invention is to provide an improved piston head assembly having means for attaching the crown portion of the assembly to the piston arm without drilling an external hole in the piston assembly.

Another object of the invention is to provide a ridged inner surface of the crown portion of a piston assembly thus allowing more heat to be removed from the interior surface of the crown portion.

A further object of this invention is to provide a piston head assembly for an internal combustion engine with improved fuel efficiency, increased engine power, reduced emissions, and improved engine performance due to less dead-air space between the annular top ring groove on the piston crown and the top of the piston.

BRIEF DESCRIPTION OF THE DRAWINGS

The foregoing and other objects will become more readily apparent by referring to the following detailed description and the appended drawings in which.

DETAILED DESCRIPTION

The invented piston device comprises a two-piece piston assembly with a piston skirt 10 and a piston crown 12. In the preferred embodiment, the material composition of piston skirt 10 is an aluminum alloy and the material composition of piston crown 12 is steel or titanium alloy.

Figure 4:
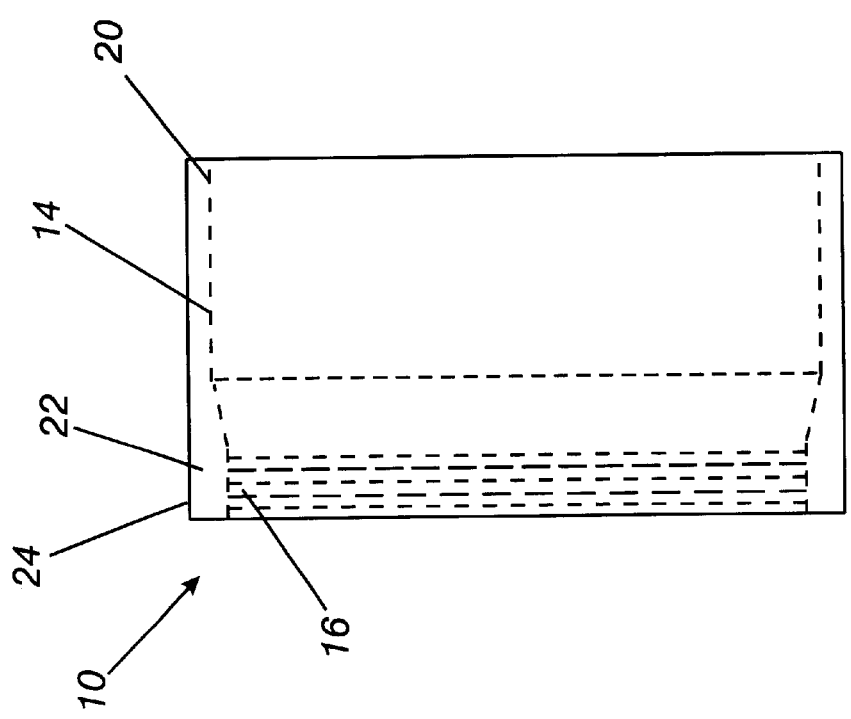
FIG. 4 is a side view of the preferred embodiment of the piston skirt for the two-piece piston assembly.

Referring now to the drawings, and particularly to FIG. 4, the piston skirt 10 has side walls 14. Each side wall 14 has a lower side wall 20, a transition side wall 22, and an upper side wall 24. The lower side wall 20 has a smaller wall thickness than the transition side wall 22 or the upper side wall 24. The transition portion has a wall thickness of increasing size from the lower side wall 20 to the upper side wall 24. The wall thickness can increase in a non-linear, linear, exponential, or tapered manner from the lower side wall 20 to the upper side wall 24. The profile of the cross section of the wall is selected to provide the optimal ratio of piston weight to maximum applied load for the piston skirt 10.

Figure 5:
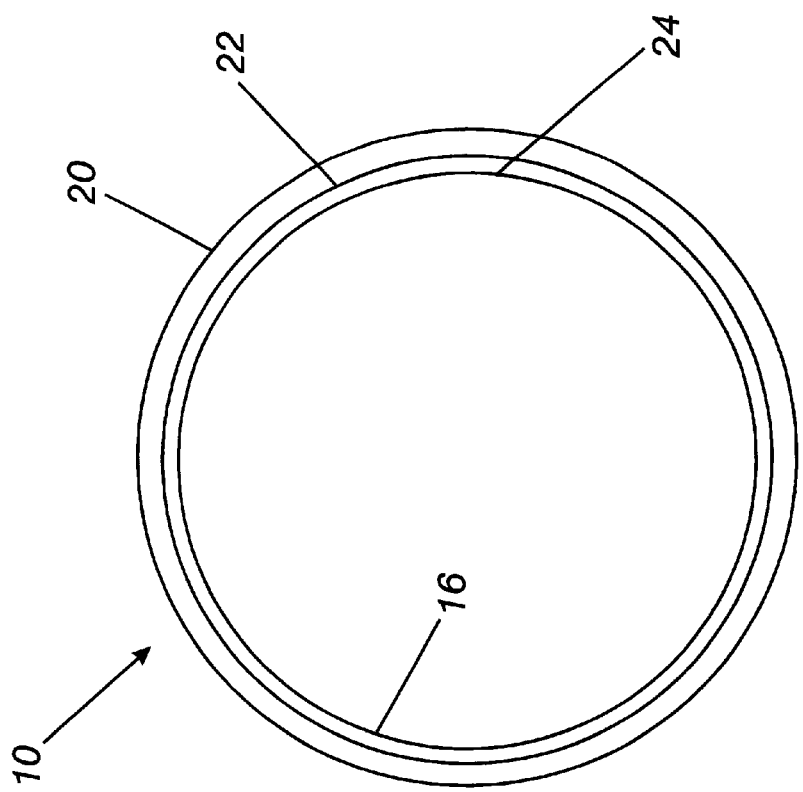
FIG. 5 is a bottom view of the piston skirt for the two-piece piston assembly as shown in FIG. 4.

As shown in FIGS. 4 and 5, the upper side wall 24 has an inner surface 16 for joining the piston skirt 10 to the piston crown 12. In the preferred embodiment, the inner surface 16 has an opposing abutment surface to allow the inner surface 16 to be coupled with a corresponding threaded surface.

Figure 1:
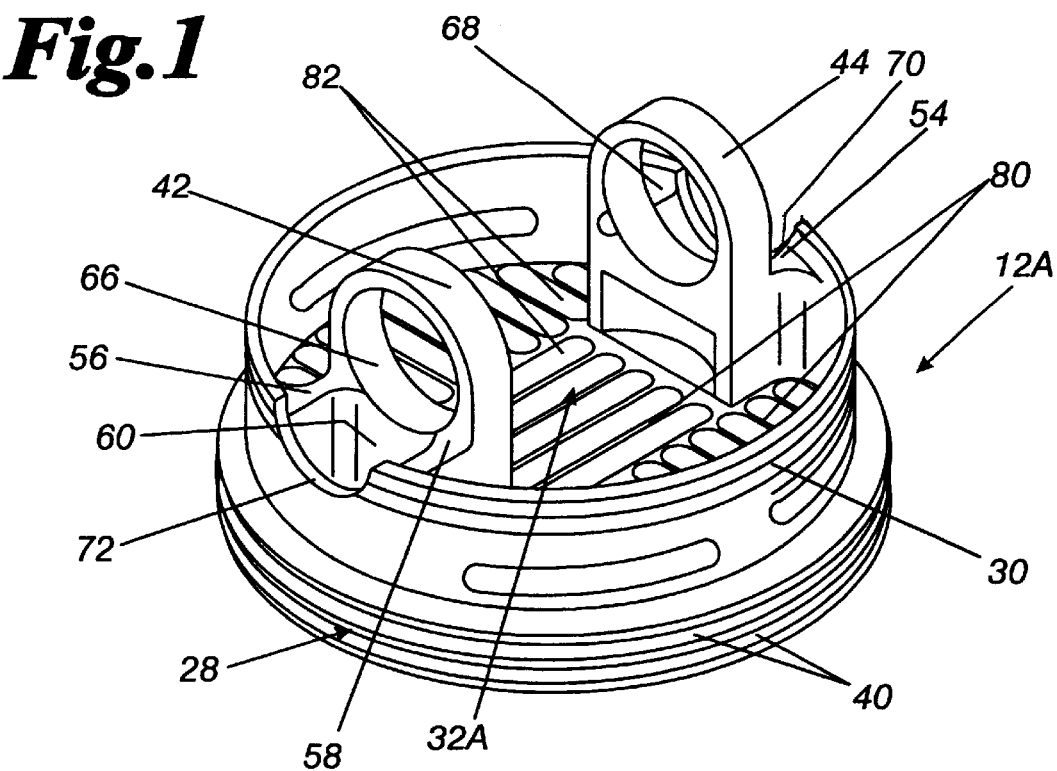
FIG. 1 is a perspective view of the piston crown for a two-piece piston assembly.
Figure 2:
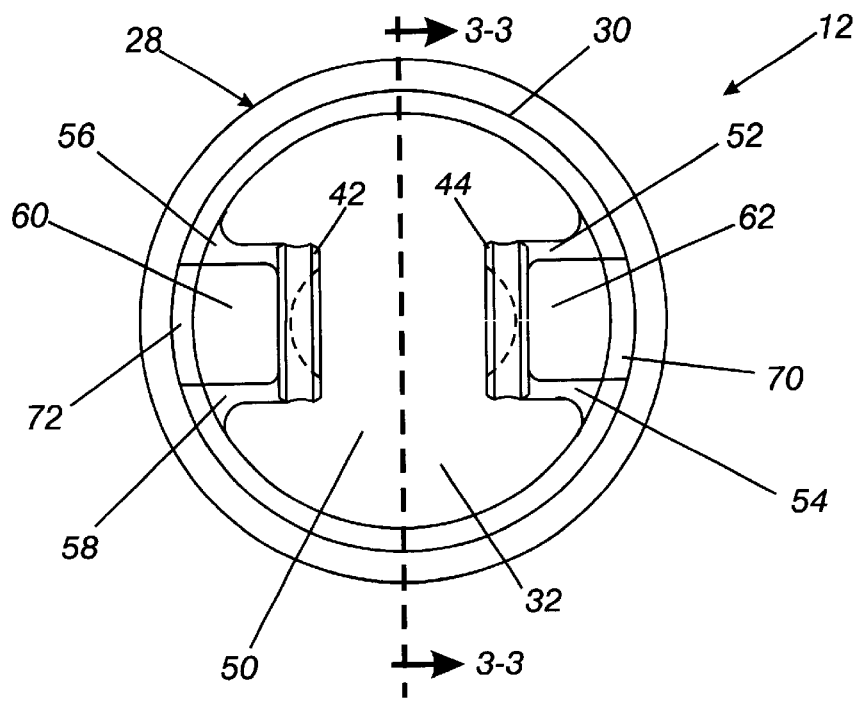
FIG. 2 is a bottom view of the piston crown shown in FIG. 1.
Figure 3:
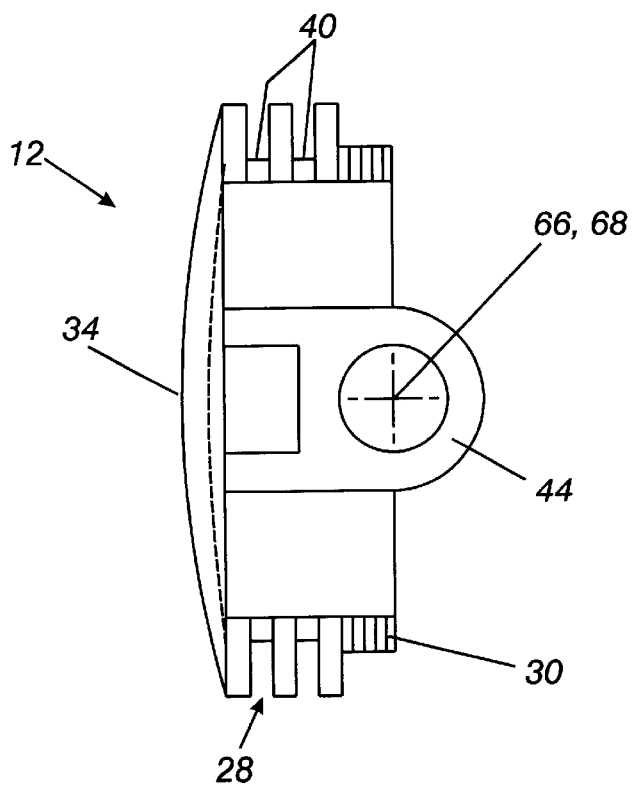
FIG. 3 is a side cross sectional view of a preferred embodiment of the piston crown for the two-piece piston assembly taken along line 3—3 of FIG. 2.

Referring now to the drawings, and particularly to FIGS. 1–3, the piston crown 12 has a grooved surface 28, an outer surface 34, an inner surface 32, and a rim 30. The grooved surface 28 has a plurality of annular grooves 40. The annular grooves receive piston rings (not shown). The outer surface 34 is adjacent to the grooved surface 40 and opposite the rim 30. In the preferred embodiment the outer surface 34 of the crown is convex or dome shaped.

The inner surface 32 has a pair of pin bosses 42, 44 extending downward from the inner surface 32. The pin bosses 42, 44 and the inner surface 32 form a chamber 50. Each pin boss 42, 44 connects to two attachments 52, 54, or 56, 58. The attachments 52, 54, 56, 58 attach to each pin boss 42, 44 and the inner surface 32, in such manner that the attachments, the pin bosses, and the inner surface form two minor pits 60, 62. Each pin boss 42, 44 is provided with a hole 66, 68.

The rim 30 has arcuate recessions 70, 72. These recessions 70, 72 allow the pin (not shown) to be inserted through the pin boss holes 66, 63 before attaching the skirt 10 to the crown 12. The pin is fitted entirely within the piston skirt 10 without the need to drill external holes through the piston skirt 10.

The recessions 70, 72 also reduce the distance from the closest point on the outer diameter of the hole in each pin boss 66, 68 to the apex of the piston crown 12. As the distance from the apex of the piston crown to the closest point on the outer diameter of the hole in each pin boss 66, 68 decreases, the length of the piston rod increases. The length of the piston rod is inversely related to the weight of a piston. In the preferred embodiment, the angle between the closest point on the outer diameter of the hole in each pin boss 66, 68 to the apex of the piston crown 12, and the closest point on the edge of each recession 70, 72 is 180 degrees.

In the preferred embodiment, piston crown 12 is made by machining a single steel or titanium workpiece. The piston crown 12 may also be manufactured by casting, forging, powder metallurgy, or any other suitable manufacturing method. In addition, any manufacturing method that joins a pin boss to the dome that results in a bond of sufficient strength to operate the piston is suitable such as by welding the pin bosses 66, 68 to the piston crown 12.

In preparing the invention for operation, the piston skirt 10 is placed over a piston rod (not depicted), which is attached to a crankshaft. The piston skirt 10 is moved into position on the piston rod, such that it is located below a hole in the piston rod (not shown). Before attaching the piston skirt 10 to the piston crown 12, a pin (not shown) is connected to the piston crown 12 by inserting the pin through one hole 66 of one pin boss 42, then through the hole(s) in the piston rod (not shown), and finally through the second hole 68 of the second pin boss 44. The pin has a length that is less than the inner diameter of the thread receiving portion of the piston skirt 12, which eliminates the need for external holes in the piston assembly. The pin must be sufficiently long to stay engaged within the holes 66, 68.

After the pin is attached to the piston rod and piston crown, the piston skirt 10 is attached to the piston crown 12 by engaging the inner surface 16 of the piston skirt 10 with the rim 30 of the piston crown 12. The preferred embodiment has a threaded rim 30 as the coupling surface.

In operation, a fuel-air mixture is injected into the cylinder in which the piston assembly is seated. The fuel-air mixture is ignited, which creates an explosion. The force of the explosion propels the piston assembly and causes the pin boss to apply force to the pin. The pin applies force to the piston rod, causing the piston rod to move away from the explosion. The piston rod drives an associated crankshaft.

ALTERNATIVE EMBODIMENTS

The choice of materials is not limited to steel or titanium for the piston crown, and aluminum for the piston skirt. Steel and titanium have good mechanical and thermal properties for the piston crown because of their higher melting points and lower coefficient of thermal expansion. The use of steel or titanium provides more options for inserting the pin through the pin boss. The coefficient of thermal expansion of steel or titanium allows a pin to be held in place by press fitting such a pin into the pin bosses.

Other high melting point, low coefficient of thermal expansion materials include, but are not limited to; titanium alloys, iron alloys, nickel alloys, titanium-aluminum alloys, nickel-aluminum alloys, titanium-nickel-aluminum alloys, titanium-nitrogen alloys, titanium-niobium alloys, intermetallics, ceramics, and composites. The piston skirt may be manufactured from any lightweight alloy with thermal properties similar to aluminum. Both the piston crown and piston skirt may be manufactured from two or more materials.

Figure 8:
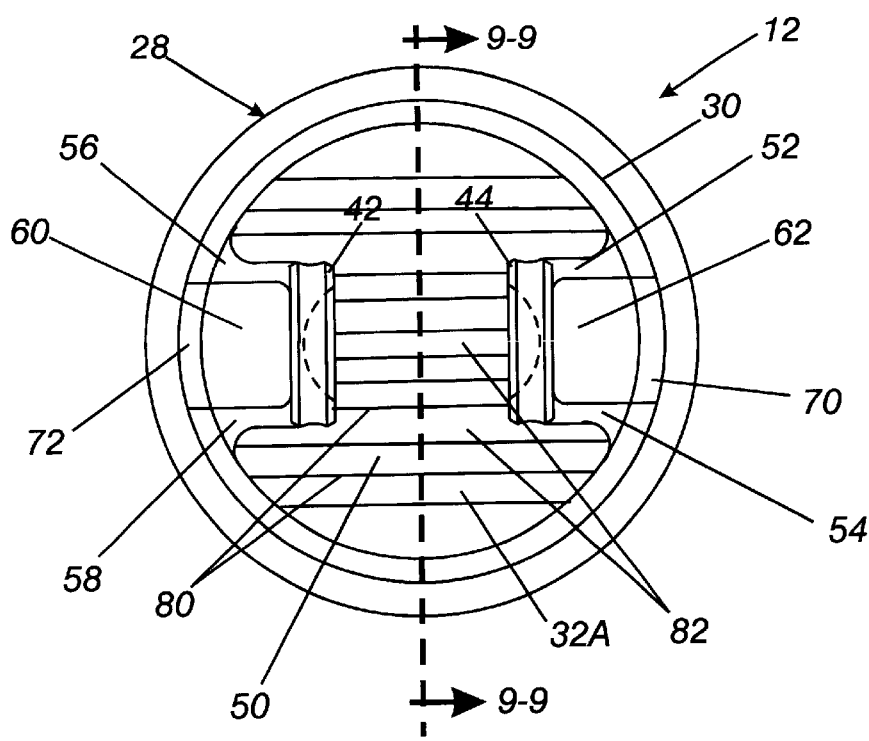
FIG. 8 is a bottom view of a piston crown with ridges.
Figure 9:
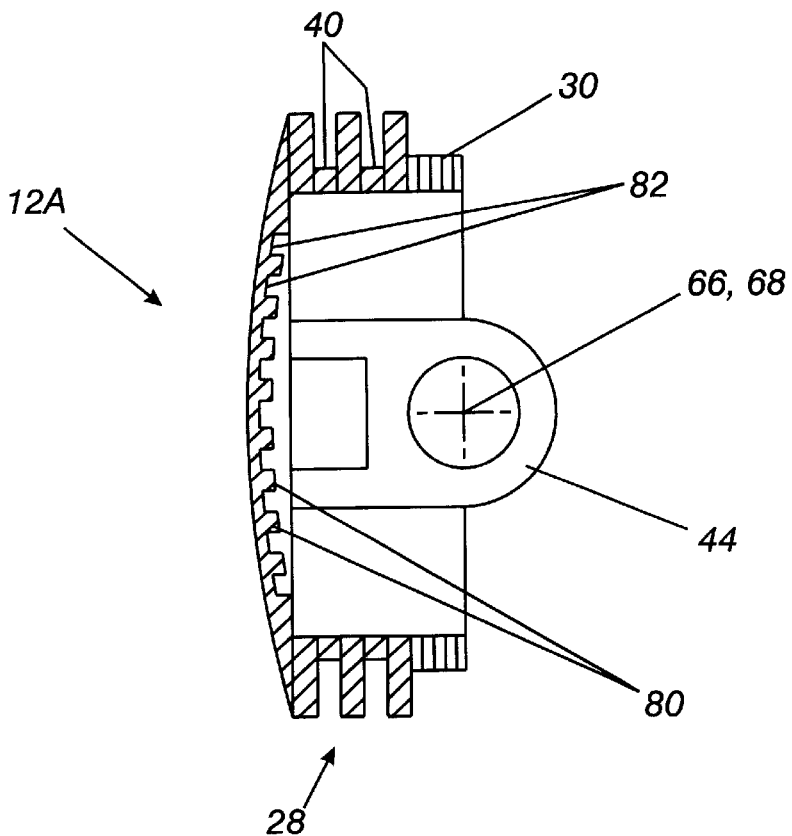
FIG. 9 is a cross sectional view of a piston crown with ridges taken along line 9—9 of FIG. 8.

An alternative inner surface 32a of the piston crown 12a may have a plurality of ridges 80, as shown in FIGS. 1, 8 and 9. The ridges 80 can be produced by machining channels 82 in the piston crown inner surface 32a. The channels 82 may have a honeycomb or fined pattern. The ridges 80 provide greater surface area, which provides a higher rate of heat dissipation. In addition, the ridges 80 reduce the weight of the piston crown 12a, which reduces the overall piston assembly weight.

Figure 10:
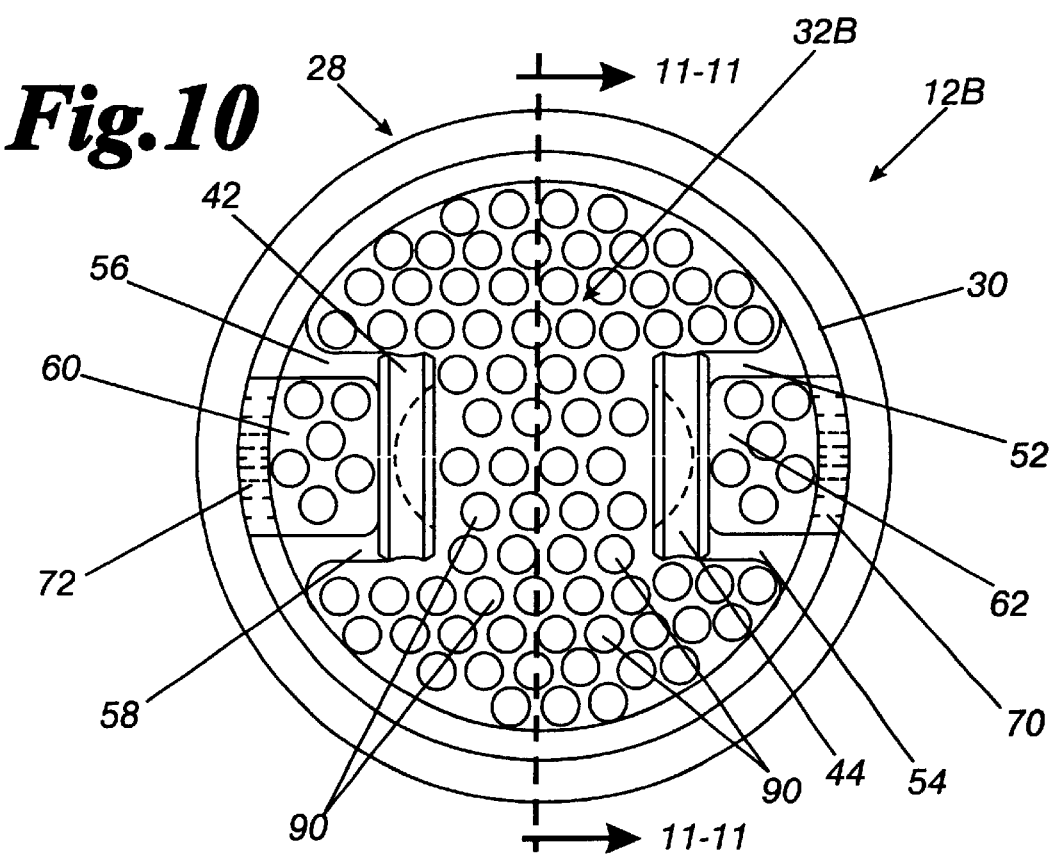
FIG. 10 is a bottom view of a piston crown with holes extending partially through the piston crown.
Figure 11:
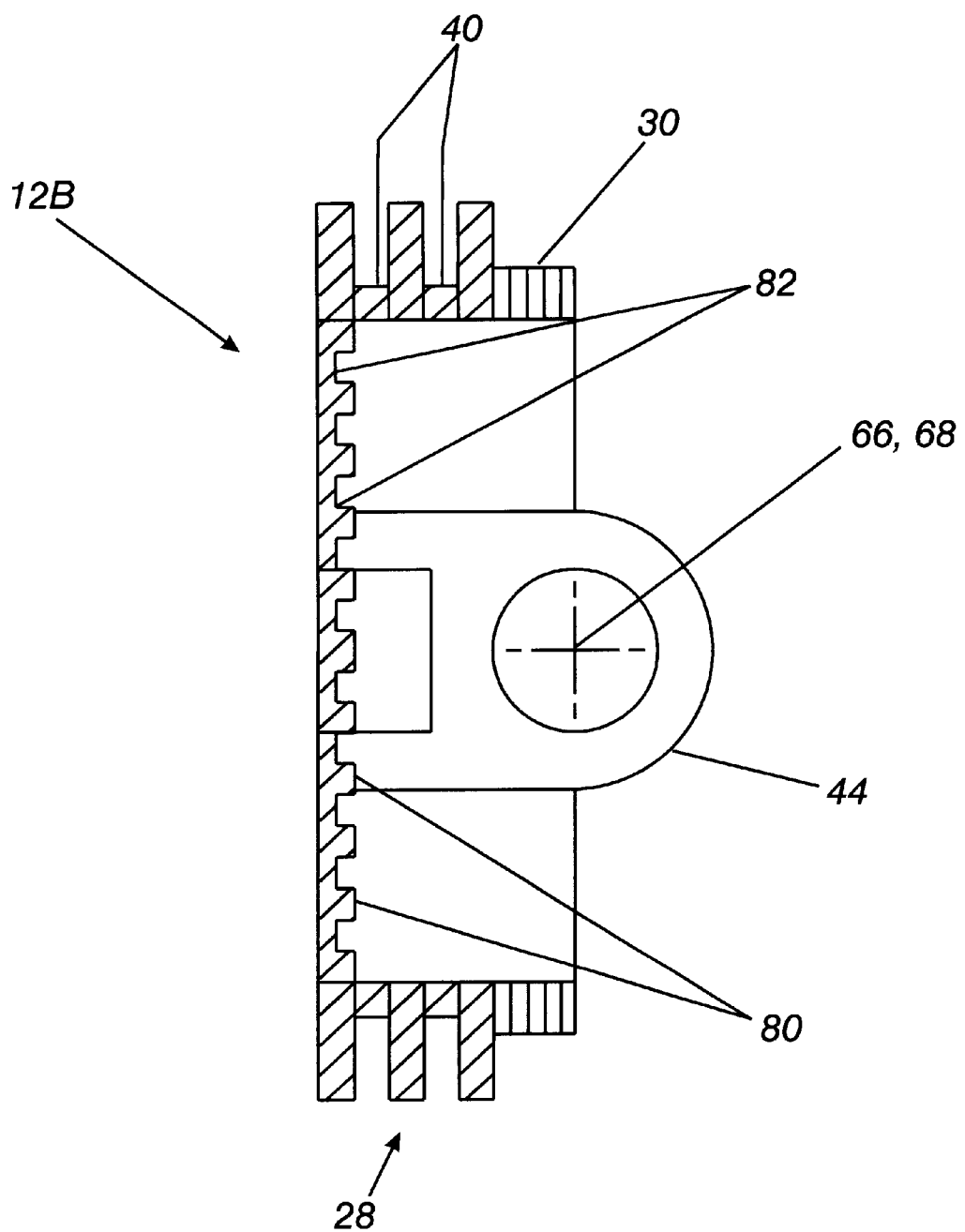
FIG. 11 is a cross sectional view of a piston crown with holes extending partially through the piston crown taken along line 11—11 of FIG. 10.

Another alternative inner surface 32b of the piston crown 12b, as shown in FIGS. 10 and 11, may be provided with a plurality of holes 90, each hole 90 formed by boring partially, but not fully, through the inner surface 32b of the piston crown 12b. The holes 90 provide greater surface area, which provides a higher rate of heat dissipation. In addition, the holes 90 reduce the weight of the piston crown 12b, which reduces the overall piston assembly weight.

Figure 6:
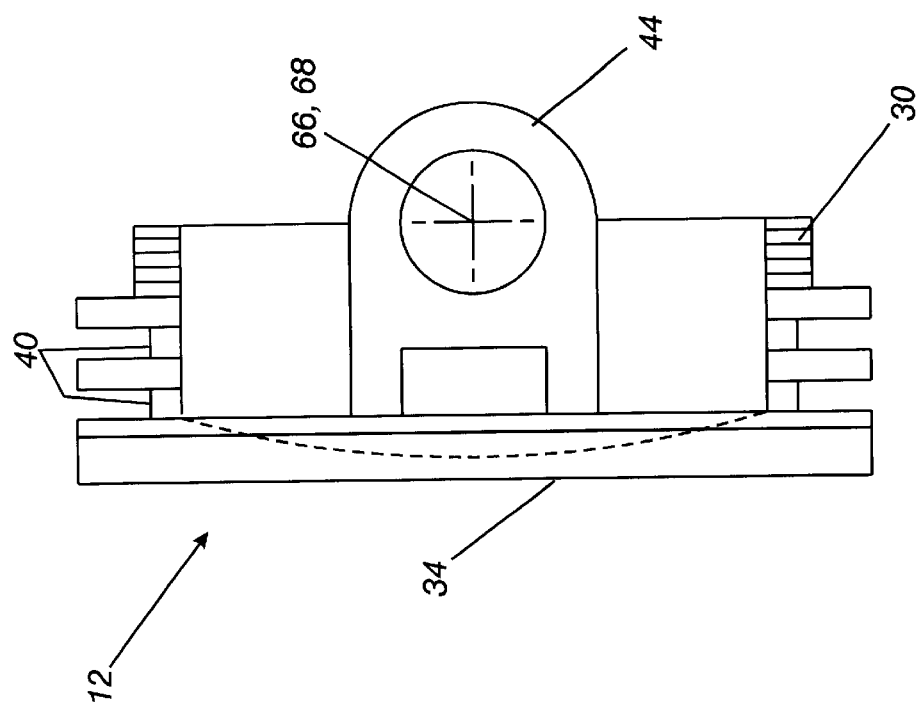
FIG. 6 is a cross sectional side view of another embodiment, similar to FIG. 3, but showing the piston crown having a dished top.
Figure 7:
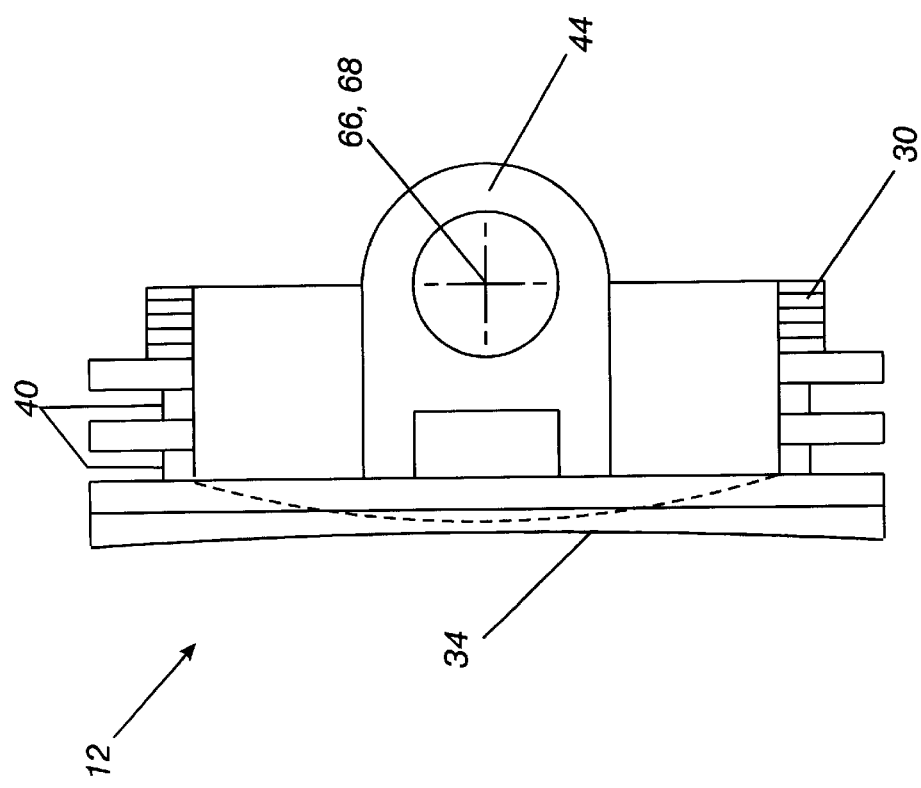
FIG. 7 is a cross sectional side view of still another embodiment, similar to FIG. 3, but showing the piston crown having a flat top.

Referring now to FIGS. 3, 6, and 7, the outer surface 34 of the piston crown may be convex (dome-shaped), flat, or concave (dished).

In the preferred embodiment, the piston crown is a single unit, which is manufactured by machining a single stainless steel workpiece. The piston crown may also be manufactured by casting, forging, powder metallurgy, or any other suitable manufacturing method. In addition, any manufacturing method that joins a pin boss to the inner surface that results in a bond of sufficient strength to operate the piston should be successful. Such methods include, but are not limited to, welding, soldering, pinning, and frictional or interlocking connections.

In the preferred embodiment the piston crown has threads and the piston skirt has a thread receiving portion. The piston skirt couples with the piston crown by the threaded portion of the crown being engaged with the thread receiving portion. However the use of threads to join the piston skirt to the piston crown is not critical, and any other suitable method or fastener can be used. For example, the piston crown could be attached to the piston skirt by machine screws.

The pin may be attached to the pin bosses and the piston rod by the spiral locking method, by press fitting the pin into the rod, or by inserting a bushing in the hole and inserting a pin through the bushing. The use of materials with low coefficients of thermal expansion, such as titanium, stainless steel, or steel, eliminates the need for a bushing. The use of materials with low coefficients of thermal expansion also allows the pin to be press fit into the pin boss, which provides the maximum strength for the piston.

Another embodiment has a high melting point low thermal conductivity barrier material placed between the piston crown and the piston skirt. The barrier material may be a separate annular piece attached to the threads of the piston crown. The barrier may also be part of the piston crown or the piston skirt.

SUMMARY OF THE ACHIEVEMENT OF THE OBJECTS OF THE INVENTION

From the foregoing, it is readily apparent that I have invented: an improved: two-piece piston assembly having a crown portion made of a stronger material than prior constructions, with better high-temperature mechanical properties and a lighter weight side wall portion with higher thermal conductivity; a two-piece piston assembly having a crown portion and a skirt portion which are readily attachable; an improved piston head assembly having means for attaching the crown portion of the assembly to the piston arm without drilling an external hole in the piston assembly, a ridged inner surface of the crown portion of a piston assembly thus allowing more heat to be removed from the interior surface of the crown portion; and a piston head assembly for an internal combustion engine with improved fuel efficiency, increased engine power, reduced emissions, and improved engine performance due to less dead-air space between the annular top ring groove on the piston crown and the top of the piston.

It is to be understood that the forgoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A piston for use in a cylinder of an internal combustion engine having a piston rod, with a pin receiving opening therein, and a pin for insertion into the pin receiving opening, said piston comprising:
    a piston crown comprising:
        a top portion having an inner surface wherein said inner surface has a plurality of depressions, each depression extending partially, but not fully, through the inner surface of the piston crown thereby increasing the surface area of said inner surface and the rate of heat dissipation from said inner surface and decreasing the weight of said piston crown;
        a cylindrical rim extending from said top portion; and
        a pair of pin bosses disposed at least partially within said rim and extending from said inner surface, each of said pin bosses having an opening formed therethrough for receiving an end of the pin.
2. The piston according to claim 1 wherein said depressions are holes.
3. The piston according to claim 1 wherein said depressions are channels.
4. The piston according to claim 3 wherein said channels are in a honeycomb pattern.
5. The piston according to claim 1 wherein said top portion has a circumferential edge and wherein a plurality of annular grooves are formed in said circumferential edge.
6. The piston according to claim 1 wherein said top portion has an outer surface opposed to said inner surface and wherein said outer surface is convex.
7. The piston according to claim 1 wherein said top portion has an outer surface opposed to said inner surface and wherein said outer surface is concave.
8. A piston for use in a cylinder of an internal combustion engine having a piston rod, with a pin receiving opening therein, and a pin for insertion into the pin receiving opening, said piston comprising:
    a piston crown comprising:
        a top portion having an inner surface;
        a cylindrical rim extending from said top portion and having a terminal edge opposed to said top portion; and
        a pair of pin bosses disposed at least partially within said rim and extending from said inner surface, each of said pin bosses having an opening formed therethrough for receiving an end of the pin and wherein at least a portion of each of said opening is closer to said inner surface than said terminal edge.
9. The piston according to claim 8 wherein each of said openings have a common central axis.
10. The piston according to claim 9 further comprising at least one recess in said cylindrical rim and wherein the common central axis extends through said recess.
11. The piston according to claim 10 wherein the pin can extend through said recess and into said openings.
12. The piston according to claim 11 wherein said cylindrical rim has two recesses and wherein the common central axis passes through said recesses and said holes.
13. The piston according to claim 12 wherein said recess extends through said rim and said recess extends from said terminal edge towards said inner surface.
14. The piston according to claim 13 wherein said top portion has a circumferential edge and wherein a plurality of annular grooves are formed in said circumferential edge.
15. A piston for use in a cylinder of an internal combustion engine having a piston rod, with a pin receiving opening therein, and a pin for insertion into the pin receiving opening, said piston comprising:
    a tubular cylindrical piston skirt; and
    a piston crown removably connectable to said skirt, said piston crown comprising:
        a top portion having an inner surface;
        a cylindrical rim extending from said top portion, said rim having a terminal edge opposed to said inner surface and at least one recess;
        a pair of pin bosses disposed at least partially within said rim and extending from said inner surface, each of said pin bosses having an opening formed therethrough adapted for receiving an end of the pin, wherein each of said opening have a common central axis which extends through said recess; and wherein said piston skirt is adapted to longitudinally confine the pin to a length no more than an inner diameter of said rim when said piston skirt and said crown are connected.

16. The piston according to claim 15 wherein said pin is press fitted into said openings.

17. The piston according to claim 15 wherein said skirt has a inner surface having a diameter no greater than the inner diameter of said rim.

18. The piston according to claim 15 wherein the piston crown is made from a material selected from the group consisting of steel, stainless steel, titanium, intermetallics, and ceramics, and the piston skirt of made of aluminum.

19. The piston according to claim 15 wherein said pin bosses are partially disposed within said skirt when said skirt is connected to said piston crown.

20. The piston according to claim 15 wherein said piston skirt has a lower side wall and an upper side wall, and said lower side wall has a lesser wall thickness than said upper side wall.

* * * * *